United States Patent Office 2,745,286
Patented May 15, 1956

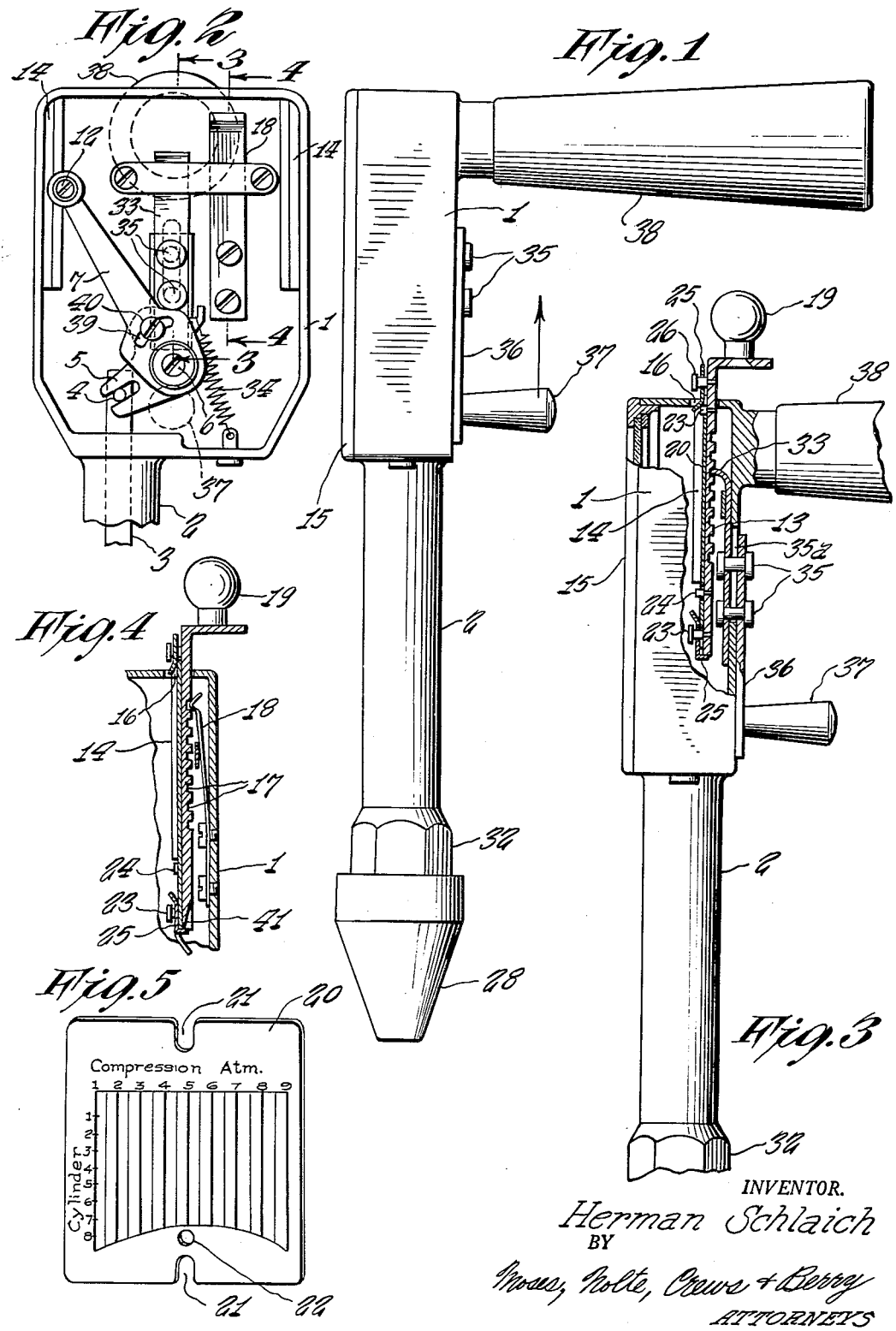

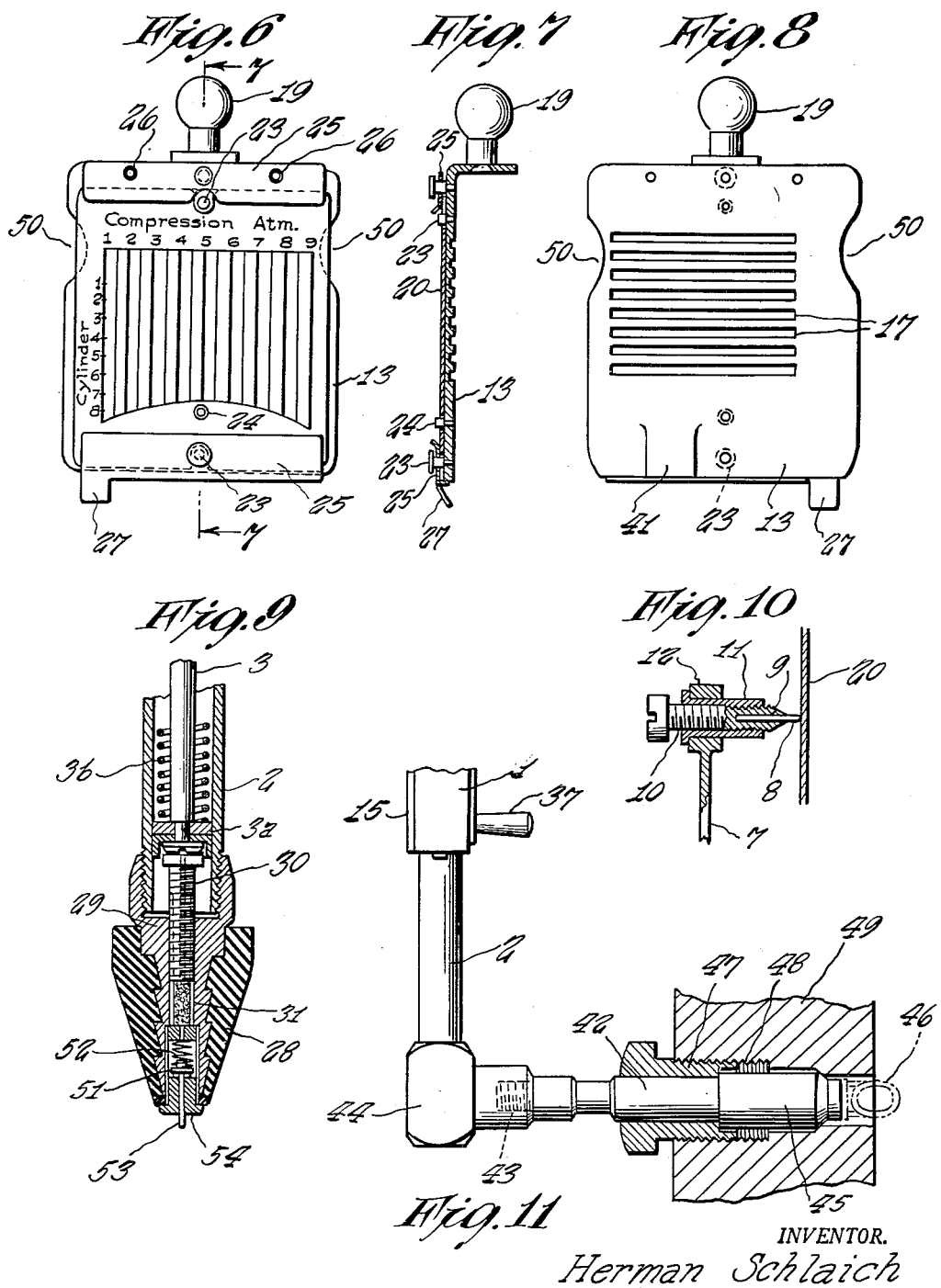

2,745,286

COMPRESSION MEASURING AND RECORDING INSTRUMENTS

Herman Schlaich, Elmhurst, N. Y.; Lottie Schlaich and President and Directors of The Manhattan Company, executors of said Herman Schlaich, deceased Application November 23, 1951, Serial No. 257,767

1 Claim. (Cl. 73—391)

In multi-cylinder engines it is possible, by means of known instruments, to determine successively the compression in the various cylinders, but it is then necessary to note down in writing the data indicated. Apart from the fact that written work of this type is not done in by far the greater number of cases, mistakes in the actual written record are unavoidable. Furthermore, data written down in this manner cannot be checked for accuracy.

The present invention relates to an instrument for measuring and recording compression, in which a recording device is connected to the pressure responsive element of the indicator device, so that the compression of each cylinder may be recorded, that is to say, written out, and a compression record obtained.

In preferred forms of the invention the casing of the device contains a stylus or pen operatively connected with a pressure responsive element and which is used to make a record of the compression on each cylinder successively upon a recording block or tablet mounted in the casing and which may be moved to a new position after each operation of the stylus, so that a series of recording lines are made, one for each cylinder. A permanent record showing the compression of each cylinder for the entire engine is thus produced, enabling the conditions of the cylinders to be at once determined. Furthermore, the record may be made in permanent form which can be filed away for future reference when needed.

In the construction shown a removable slide is provided in the instrument which may either itself form the record surface or preferably it is arranged to carry a paper sheet which can be readily applied to or removed from the slide, and upon which the actual record is made.

The device may also be used as an indicator for visual reading of the compression in the cylinder. For this purpose the instrument housing is preferably provided with a transparent portion. Also the pressure pipe of the instrument may be provided with a check valve in the end thereof projecting into the cylinder so as to trap the pressure temporarily in the device.

The general object of the invention is to provide an improved construction for the purpose described. A particular object is to provide an instrument which may be handled with one hand, moved rapidly from cylinder to cylinder and manipulated so as to make a separate record of the compression in each of the successive cylinders.

Another object of the invention is to provide a construction in which record sheets may be readily inserted and quickly changed.

Other objects and advantages of the construction shown will appear in the course of the following detailed description of an illustrative embodiment.

In the drawings

Figure 1 is a side elevation of a compression tester embodying the invention.

Figure 2 is a front elevation of the housing of the instrument with the front cover and the recording tablet removed so as to show the internal mechanism.

Figure 3 is a view similar to Fig. 1 with parts of the housing broken away and with the slide in position and shown in vertical section on line 3—3 of Fig. 2.

Figure 4 is a fragmentary vertical section on line 4—4 of Fig. 2.

Figure 5 is a front view of the record sheet or chart.

Figure 6 is a front view of the slide with the record sheet or chart in place.

Figure 7 is a vertical section on line 7—7 of Fig. 6.

Figure 8 is a rear elevation of the slide.

Figure 9 is a vertical section of the lower part of the pressure tube and fitting for engaging in the opening in the cylinder and showing the valve construction.

Figure 10 is a section through the end of the pointer and stylus carrying head, and Figure 11 is a side elevation of a modified construction showing a fitting for applying the instrument to an engine of the diesel type, part of the engine cylinder being shown in section.

Referring to the drawings in detail, the tester comprises a casing or housing 1, at the lower end of which projects a pressure pipe or cylinder 2, through which passes the transmission rod 3 connected to a pressure responsive device, such as a piston 3a sliding in the pipe or cylinder 2, and the upward movement of which is resisted by a compression spring 3b (Fig. 9). Obviously any suitable type of pressure responsive means may be utilized. The rod 3 carries a pin 4 which engages a slot in the lever 5 of a pointer 7 (Fig. 2), the pointer 7 being mounted to pivot at 6, so that pressure in the pipe 2 acts on the piston 3a and rod 3 to cause the pointer 7 to swing. The end of the pointer 7 carries a recording pen or stylus 8 (Fig. 10), which may, for example, be a steel point which scratches away a layer of wax from a prepared record sheet. The recording stylus 8 is shown as mounted in a drilled hole 9 in a screw 10 which is adjustable in a sleeve 11. The sleeve 11 is carried in a bushing 12 on the pointer 7. By adjusting the screw 10 the stylus may be displaced as required in the longitudinal direction so as to adjust the pressure with which it bears on the chart.

Mounted in the instrument housing in a position to be acted upon by the stylus is a tablet or slide 13 adapted to be inserted into the casing 1 and to be readily removable. The tablet or slide 13 is guided in guides 14 in the casing 1 (Fig. 2). The front of the casing 1 is closed by means of a cover 15 which may be of transparent material or has a transparent window, so that the internal mechanism illustrated in Fig. 2 may be inspected and the movements of the pointer observed.

The tablet or slide 13 is inserted into the casing from above, for which purpose the casing 1 is provided with a slot 16 (Fig. 3). The tablet 13 may be adjusted and secured for height, for example, by providing it on the back with spaced grooves, slots or the like 17, and which act in conjunction with a check spring 18, (Figs. 2 and 4) provided on the casing 1, in such manner that when the tablet 13 is displaced, the spring 18 snaps into the next groove 17 and thus retains the tablet 13 in position. The tablet 13 is provided with a handle 19 projecting from the casing 1 to facilitate handling.

On the opposite face of the tablet or slide 13 provision is made for the application of a record sheet or chart divided along its width to indicate pressures and along its height to indicate the successive cylinders being treated. As illustrated, the record is made on a paper sheet or chart 20 which has spaced vertical lines thereon carrying suitable indicia indicating pressures which may be in pounds per square inch, atmospheres, or other units, the indicia arranged in a vertical column at the side of the chart showing the numbers of the successive cylinders of the motor to be tested. In use the compression tester is applied to the first cylinder and a record of the compression tested is produced on the chart by a movement of the pointer 7 opposite cylinder No. 1. The slide carrying the chart is then moved up a step and the compression tester applied to the second cylinder and a record made opposite cylinder No. 2, and so on until all the cylinders have been tested. The chart may be of any suitable character and attached to the slide in any desired manner. A simple and effective construction is shown in which the record sheet or chart 20 is provided at its top and bottom with slots 21 and has a hole 22 located above the lower slot 21. The tablet or slide 13 is provided with pins or projections 23 which are engaged by the slots 21 of the chart, and with a projection 24 adapted to fit through the hole 22 in the chart. The tablet or slide 13 is also preferably provided with retaining strips 25 at the top and bottom, which engage the top and bottom edges of the chart. The bottom retaining strip is held by the pin 23 and the top retaining strip by pins or rivets 26. To facilitate removal of the chart from the slide, the edges of the latter may be provided with finger notches 50 (Figs. 6 and 8).

The lower strip 25 preferably has a downwardly projecting rearwardly inclined portion 27 forming a guide surface to guide the stylus on to the face of the chart when the slide is inserted in the casing. The back of the slide is also preferably provided with an inclined surface 41 over which the end of the spring 18 slides when the slide is inserted.

Any suitable means for applying the compression tester to the cylinders to be tested may be employed. Preferably at the lower end of the compression pipe or cylinder 2 is a fitting carrying a cone-shaped member 28 of rubber or other flexible material which may be pressed into a spark plug hole in the cylinder head. This arrangement permits the instrument to be applied by mere hand pressure and to be quickly removed from one cylinder to another. The rubber cone 28 is shown as mounted upon a metal fitting 29, fitted on the lower end of the pipe or cylinder 2. Passing through the fitting 29 is an adjusting screw 30 which engages the bottom of the piston 3a and may be thereby used to regulate the tension of the spring 3b and the initial position of the piston. The screw 30 is provided with longitudinal grooves 31 so as to permit passage of air to the cylinder below the piston.

In order to progressively raise the tablet or slide 13 after the compression of a cylinder has been recorded on the chart, so as to advance the chart for recording of the pressure of the next cylinder, a ratchet feed device is provided which is shown as comprising a spring pawl 33 mounted on the pins 35 which slide through a slot 35a in the back of the casing. The pins are also attached to a sliding plate 36 mounted externally on the casing and provided with a handle 37, so that if the handle is displaced in the direction indicated by the arrow in Fig. 1, the plate 36 is pushed upwardly, the pins 35 carrying the spring pawl 33 with them. The spring pawl 33 engages each time in one of the grooves 17 of the tablet so that by a movement upwards of the handle 37 the spring pawl 33 displaces upwardly by one division of its movement the tablet 13, together with the chart thereon.

On the outer surface of the casing 1, on which is mounted the handle 37 for the plate 36 and the spring pawl 33, there is provided a hand-grip 38 mounted on the casing 1. The handle 37 and the hand-grip 38 are successively disposed along the length of the instrument in such manner that the hand-grip 38 can be seized in the hand in the manner of a pistol butt, and the handle 37 for the spring-pawl can be seized by the fore-finger in the manner of a trigger to form a one-handed instrument, that is to say, an instrument needing only one hand for its operation.

So that the pointer 7 with its recording stylus 8 can be accurately adjusted upon the chart 20, the pointer 7 is so mounted upon the lever 5 that it may be loosened and tightened, for example, the pointer 7 may be provided with a slot 39 through which projects a tightening screw 40 mounted upon the lever 5.

The device operates as follows:

First the chart 20, (Fig. 5) is placed upon the tablet or slide 13 as is illustrated in Figs. 6 and 7. The tablet 13, together with the chart 20 is then inserted in the casing 1 from above. When the tablet 13 is being thrust in, the stylus 8 meets the guide track 27 so that the tablet 13 can be guided in without difficulty. As the tablet 13 is guided in, the check spring 18 slides onto a surface 41 (Figs. 4 and 8) so that the check spring will not in any way impede the sliding in of the tablet. The device is then placed in position with the cone 28 in the hole in the first cylinder to be tested. Assuming that the cylinder 1 (Fig. 5) normally has a compression of 5 atmospheres, then, if the cylinder is completely in order, the stylus 8 will move to the number 5 in the atmosphere division, and thus draw a line from the left hand side of the chart opposite to the cylinder number to the vertical line under number 5. If, on the other hand, the cylinder 1 of a multicylinder engine leaks, then, when the compression is tested, the stylus 8 will move only as far as, say, the number 3 or some less number than 5, in the atmosphere division, and draw a line correspondingly, so that even after the check is complete, that is to say, when the pointer 7 returns, there is a permanent record that the cylinder tested had a compression pressure amounting only to less than 5, for example, 3 atmospheres.

After the first cylinder is tested, then, by means of the handle 37, the tablet is drawn upwardly in the casing 1 by the extent of one groove 17, until the check spring 18 engages in the next groove 17 and thus holds tablet 13, whilst the spring 34 again draws back the spring pawl 33. The stylus 8 stands at the cylinder number 2, so that the second cylinder may be tested.

The construction illustrated by way of example in Fig. 11 differs from that according to Fig. 1 only by a different construction at the lower end of the pressure tube 2. This construction is particularly adapted to measuring high pressures such as obtain in diesel engines. In Fig. 11 a sealing member is illustrated which consists essentially of the extension tube 42, which is provided with a threaded plug 43 which is screwed into a head piece 44 of the pressure pipe 2. The member 42 has a head 45 of the same shape as the head of a glow plug, the normal position of the glow coil 46 of which is indicated in dotted lines in Fig. 11. On the member 42 is a threaded nut 47 which can be screwed into a threaded portion 48 of the cylinder wall 49, and thus holds the member 42 firmly secured.

The cone-shaped member 28 mounted upon the pressure pipe 2 may be provided with a valve 51 (Fig. 9) which is controlled by a spring 52, and which is provided with a pin 53 which is longitudinally displaceable in a bushing 54 against the action of the spring. When the member 28 is applied to the cylinder to be tested, the compression forces back the valve 51. When the compression tester is removed then the valve 51 closes. If the air present in the pressure pipe is to flow out, it is necessary only to set the pin 53 upon some supporting surface and press the compression testing instrument slightly downwards, whereupon the pin 53 opens the valve 51, so that the air can escape.

While I have illustrated and described in detail certain preferred forms of my invention, it is to be understood that changes may be made therein and the invention embodied in other structures. I do not, therefore, desire to limit myself to the specific construction illustrated, but intend to cover my invention broadly in whatever form its principles may be utilized.

I claim:

In a compression tester for testing and recording pressures in the cylinders of a multicylinder engine, a casing, a pressure pipe projecting from the casing, a fitting on said pressure pipe for temporary engagement with a hole in a cylinder, a piston mounted for longitudinal movement in said pressure pipe, a compression spring above said piston for opposing movement of the piston in one direction in the pipe, a longitudinally grooved adjusting screw mounted in said fitting below said piston for adjustment longitudinally toward and from said piston to form an adjustable stop for limiting the downward movement thereof, record making means in the casing, and a rod connecting said piston with said record making means.

References Cited in the file of this patent

UNITED STATES PATENTS

| | | |
|---|---|---|
| 1,253,438 | Stevens et al. | Jan. 15, 1918 |
| 1,280,354 | Zigler et al. | Oct. 1, 1918 |
| 1,637,867 | Liles | Aug. 2, 1927 |
| 1,655,615 | Kreisel | Jan. 10, 1928 |
| 2,620,656 | Peterson | Dec. 9, 1952 |

FOREIGN PATENTS

| | | |
|---|---|---|
| 225,585 | Switzerland | May 17, 1943 |
| 244,635 | Switzerland | Apr. 16, 1947 |
| 251,688 | Switzerland | Aug. 16, 1948 |